United States Patent
Maile et al.

(10) Patent No.: US 10,220,895 B2
(45) Date of Patent: Mar. 5, 2019

(54) SNOW THROWER TRACK DRIVE

(71) Applicant: Ariens Company, Brillion, WI (US)

(72) Inventors: William D. Maile, De Pere, WI (US); Craig Key, Green Bay, WI (US); Brett Bogenschutz, Appleton, WI (US); Travis Schisel, Cato, WI (US); Scott E. Deschler, Appleton, WI (US)

(73) Assignee: Ariens Company, Brillion, WI (US)

( * ) Notice: Subject to any disclaimer, the term of this patent is extended or adjusted under 35 U.S.C. 154(b) by 204 days.

(21) Appl. No.: 15/075,828

(22) Filed: Mar. 21, 2016

(65) Prior Publication Data
US 2017/0267297 A1    Sep. 21, 2017

(51) Int. Cl.
| | |
|---|---|
| *B62D 55/14* | (2006.01) |
| *E01H 5/04* | (2006.01) |
| *E01H 5/09* | (2006.01) |
| *B62D 55/06* | (2006.01) |

(52) U.S. Cl.
CPC ............. *B62D 55/14* (2013.01); *B62D 55/06* (2013.01); *E01H 5/045* (2013.01); *E01H 5/098* (2013.01)

(58) Field of Classification Search
CPC ........ B62D 55/14; B62D 55/06; E01H 5/045; E01H 5/098
See application file for complete search history.

(56) References Cited

U.S. PATENT DOCUMENTS

| | | | | |
|---|---|---|---|---|
| 549,795 | A | | 11/1895 | Ingleton |
| 1,302,317 | A | * | 4/1919 | Cowan ..................... A01B 3/50 |
| | | | | 172/258 |
| 1,353,318 | A | * | 9/1920 | Cowan ................. B62D 51/007 |
| | | | | 172/258 |
| 1,401,625 | A | | 12/1921 | Mader |
| 1,450,385 | A | * | 4/1923 | Prince ...................... A01B 3/50 |
| | | | | 172/258 |
| 2,544,774 | A | | 3/1951 | Bredl et al. |
| 2,668,408 | A | * | 2/1954 | Klenk .................... A01D 34/08 |
| | | | | 180/19.1 |

(Continued)

FOREIGN PATENT DOCUMENTS

EP    1428939    6/2004

OTHER PUBLICATIONS

PCT/US2017/023306 International Search Report and Written Opinion of the International Searching Authority dated Jun. 23, 2017 (13 pages).

*Primary Examiner* — Jamie L McGowan
(74) *Attorney, Agent, or Firm* — Michael Best & Friedrich LLP

(57) ABSTRACT

A snow thrower includes a frame, a prime mover supported by the frame, and a handle assembly coupled to the frame. The handle assembly includes a grip for an operator to grasp. The snow thrower further includes an auger housing supported by the frame, and an auger blade rotationally coupled to and disposed within the auger housing. A track drive system is coupled to the frame to facilitate movement along a ground surface. The track drive system includes a drive wheel rotatably driven by the prime mover, an idler wheel rotatably supported by the frame, and a flexible track interconnecting the drive wheel and the idler wheel. The idler wheel is translatable relative to the frame to adjust an orientation of the auger housing relative to the ground surface.

27 Claims, 11 Drawing Sheets

(56) References Cited

U.S. PATENT DOCUMENTS

| | | | |
|---|---|---|---|
| 2,709,117 A | 5/1955 | Hautzenroeder | |
| 3,049,364 A * | 8/1962 | Clay | A61G 5/061 |
| | | | 180/9.22 |
| 3,182,741 A | 5/1965 | Roach | |
| 3,349,861 A | 10/1967 | Oral | |
| 3,830,323 A | 8/1974 | Vuolevi | |
| 4,566,707 A * | 1/1986 | Nitzberg | A61G 5/066 |
| | | | 180/8.2 |
| 4,756,101 A | 7/1988 | Friberg et al. | |
| 4,825,570 A * | 5/1989 | Schmid | A01B 63/04 |
| | | | 172/817 |
| 5,438,770 A | 8/1995 | Miller | |
| 6,131,316 A * | 10/2000 | Yoshina | E01H 5/04 |
| | | | 37/242 |
| 6,164,399 A * | 12/2000 | Bays | B62D 55/0655 |
| | | | 180/9.21 |
| 6,182,383 B1 * | 2/2001 | Reed, Jr. | A01G 1/125 |
| | | | 15/340.2 |
| 6,327,799 B1 * | 12/2001 | Hanafusa | E01H 5/04 |
| | | | 37/257 |
| 6,449,882 B2 * | 9/2002 | Kono | E01H 5/04 |
| | | | 180/65.1 |
| 7,040,426 B1 | 5/2006 | Berg | |
| 7,455,141 B2 | 11/2008 | Hildebrand | |
| 7,594,557 B2 * | 9/2009 | Polakowski | B62M 27/02 |
| | | | 180/190 |
| 7,641,007 B2 * | 1/2010 | Radke | E02F 9/02 |
| | | | 180/9.52 |
| 7,644,524 B2 * | 1/2010 | Azure | E02F 3/085 |
| | | | 37/352 |
| 7,997,016 B2 * | 8/2011 | Yamazaki | E01H 5/04 |
| | | | 37/234 |
| 8,256,541 B2 * | 9/2012 | Park | B62D 55/06 |
| | | | 180/125 |
| 8,371,403 B2 | 2/2013 | Underwood | |
| 9,663,910 B2 * | 5/2017 | Muntasser | E01H 5/098 |
| 2003/0046834 A1 | 3/2003 | Hanafusa et al. | |
| 2005/0166589 A1 * | 8/2005 | Sakikawa | A01D 69/03 |
| | | | 60/487 |
| 2007/0017713 A1 | 1/2007 | Swell et al. | |
| 2014/0175864 A1 | 6/2014 | Marchildon et al. | |
| 2014/0202046 A1 * | 7/2014 | Yamazaki | E01H 5/098 |
| | | | 37/249 |
| 2014/0250739 A1 | 9/2014 | Distefanis, Jr. | |
| 2015/0107136 A1 * | 4/2015 | Fukano | E01H 5/04 |
| | | | 37/235 |

* cited by examiner

SNOW THROWER TRACK DRIVE

BACKGROUND

The present invention relates to utility machines and, more particularly, to track drive systems for utility machines.

Utility machines (e.g., lawn mowers, lawn tractors, trimmers, tillers, snow throwers, etc.) are generally used for outdoor applications such as landscaping, gardening, lawn care, or snow removal. A utility machine usually includes an engine and a means for transferring power from the engine to a ground surface to propel and maneuver the machine relative to the surface. Some utility machines include a track or continuous drive system to propel and maneuver the machine. A continuous drive system commonly includes a continuous band of treads or track plates, and at least two wheels to drive the continuous band.

SUMMARY

In one aspect, the invention provides a snow thrower including a frame, a prime mover supported by the frame, and a handle assembly coupled to the frame. The handle assembly includes a grip for an operator to grasp. The snow thrower further includes an auger housing supported by the frame, and an auger blade rotationally coupled to and disposed within the auger housing. A track drive system is coupled to the frame to facilitate movement along a ground surface. The track drive system includes a drive wheel rotatably driven by the prime mover, an idler wheel rotatably supported by the frame, and a flexible track interconnecting the drive wheel and the idler wheel. The idler wheel is translatable relative to the frame to adjust an orientation of the auger housing relative to the ground surface.

In another aspect, the invention provides a snow thrower including a frame, a prime mover supported by the frame, and a handle assembly coupled to the frame. The handle assembly including a grip for an operator to grasp. The snow thrower further includes an auger housing supported by the frame, an auger blade rotationally coupled to and disposed within the auger housing, and a track drive system coupled to the frame to facilitate movement along a ground surface. The track drive system includes a drive wheel rotatably driven by the prime mover, an idler wheel rotatably supported by the frame, and a flexible track interconnecting the drive wheel and the idler wheel. The snow thrower further includes an idler wheel adjustment mechanism for adjusting a position of the idler wheel relative to the frame. The idler wheel adjustment mechanism includes an adjustment bar having a first notch and a second notch, and a pin selectively receivable in the first notch and the second notch. The pin is received in the first notch when the idler wheel is moved to a first position, and the pin is received in the second notch when the idler wheel is moved to a second position different from the first position.

In another aspect, the invention provides a snow thrower including a frame, a prime mover supported by the frame, and a handle assembly coupled to the frame. The handle assembly including a grip for an operator to grasp. The snow thrower further includes an auger housing supported by the frame, an auger blade rotationally coupled to and disposed within the auger housing, and a track drive system coupled to the frame to facilitate movement along a ground surface. The track drive system includes a drive wheel rotatably driven by the prime mover, an idler wheel rotatably supported by the frame, and a flexible track interconnecting the drive wheel and the idler wheel. The snow thrower further includes an idler wheel adjustment mechanism for adjusting a position of the idler wheel relative to the frame. The idler wheel adjustment mechanism includes a drive mechanism supported by the frame and a plunger slideably mounted to the frame. The plunger is coupled to the idler wheel to selectively translate the idler wheel relative to the frame. The position of the idler wheel is infinitely adjustable relative to the frame by moving the plunger with the drive mechanism.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
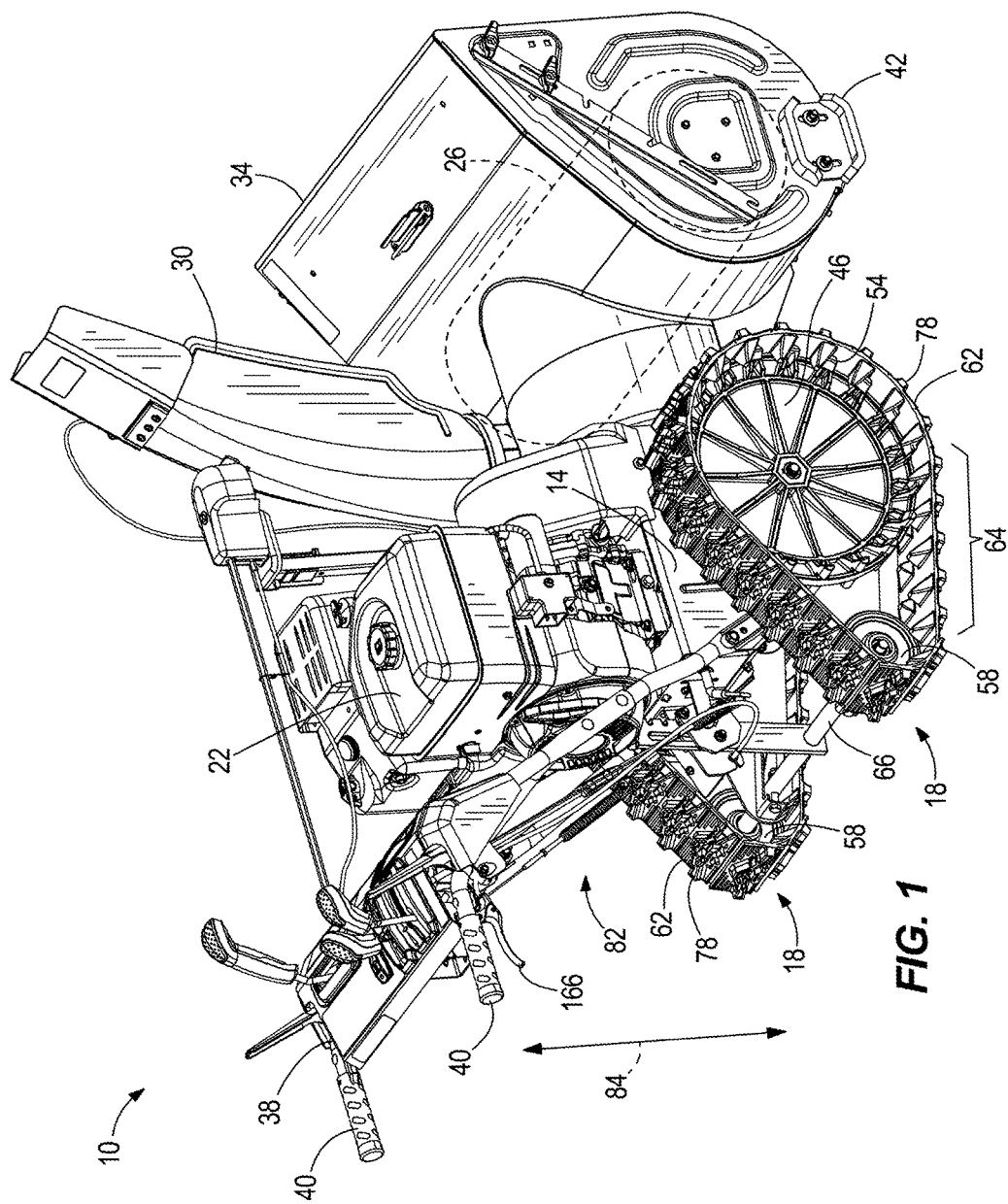
FIG. 1 is a rear perspective view of a snow thrower having a track drive system according to an embodiment of the invention.
Figure 2:
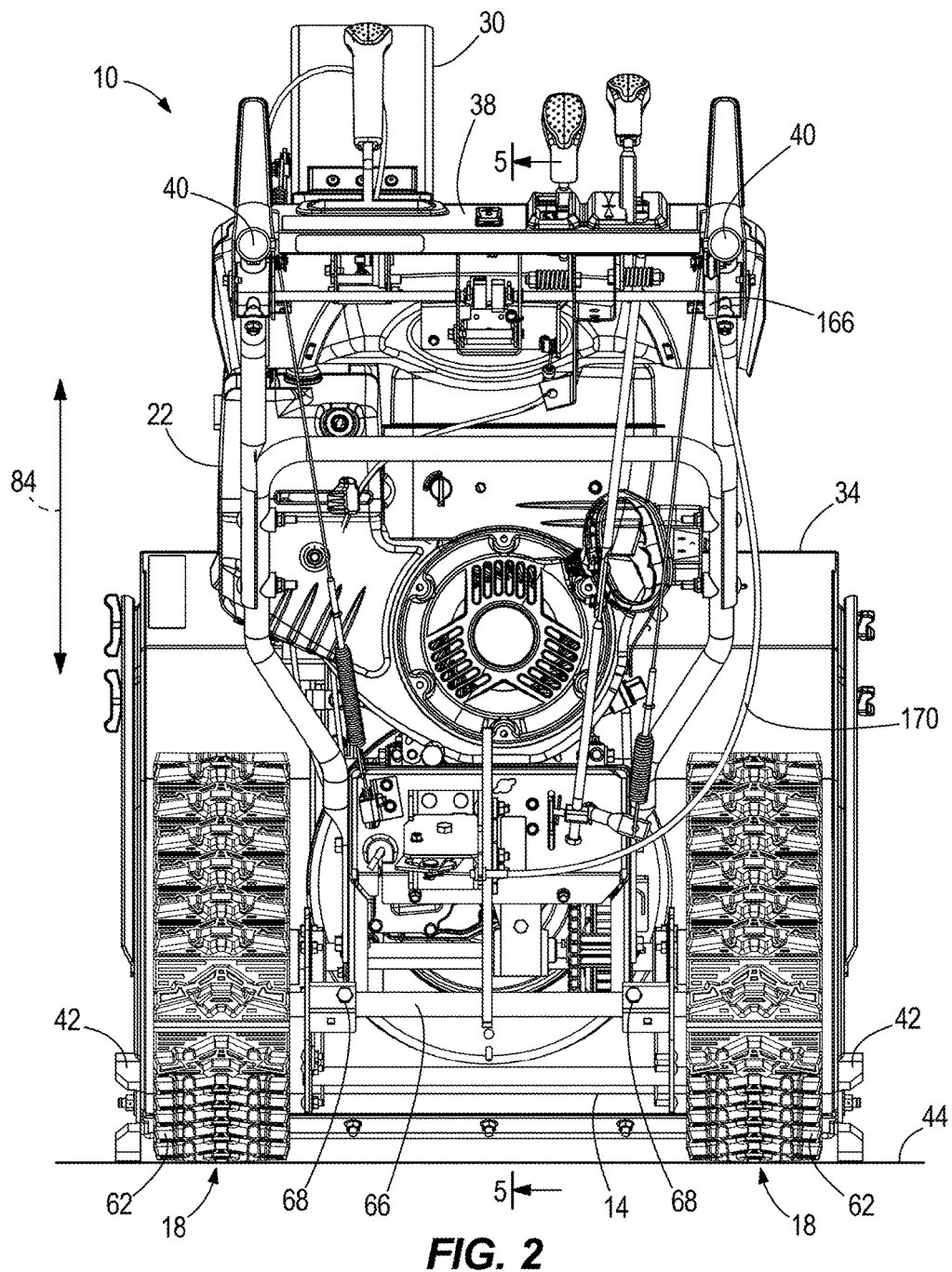
FIG. 2 is a rear plan view of the snow thrower of FIG. 1.

FIGS. 1 and 2 illustrate a snow thrower 10, which may also be referred to as a snow blower. The illustrated snow thrower 10 includes a frame 14, track drive assemblies 18, a prime mover 22, an auger 26, and a chute 30. The frame 14 includes an auger housing 34 and an operator control assembly 38. The operator control assembly 38 extends from the frame 14 in a direction opposite the auger housing 34 and includes controls to operate the snow thrower 10. The operator control assembly 38 is also configured to be grasped at grips 40 by an operator to move and maneuver the snow thrower 10 along a ground surface. The track drive assemblies 18 are rotatably coupled to the frame 14 to facilitate moving the snow thrower 10 along the ground surface.

The prime mover 22 is supported by the frame 14. The prime mover 22 includes a two-stroke or four-stroke internal combustion engine that is coupled to the auger 26 to drive the auger 26. In other embodiments, the prime mover 22 may include a battery-powered electric motor that is coupled to the auger 26 to drive the auger 26. In the illustrated embodiment, the prime mover 22 (whether an internal combustion engine or an electric motor) is coupled to the track drive assemblies 18.

The auger 26 is positioned within the auger housing 34 and coupled to the prime mover 22. The auger 26 is operable to be driven (e.g., rotated) by the prime mover 22 to draw snow into the auger housing 34 and push the snow through the chute 30. In the illustrated embodiment, the snow thrower 10 is a two-stage snow thrower that also includes a secondary impeller or fan adjacent the chute 30. The secondary impeller is driven by the prime mover 22 and throws snow out through the chute 30. The secondary impeller may be disposed within the auger housing 34 or within the chute 30. In other embodiments, the snow thrower 10 may be a single-stage snow thrower such that the auger 26 both draws snow in and pushes snow out of the snow thrower 10.

The auger housing 34 further includes two skid shoes 42 (only one of which is shown in FIG. 1). The skid shoes 42 are mounted on opposing sides of the auger housing 34. The skid shoes 42 facilitate moving (e.g., sliding) the snow thrower 10 along the ground surface during operation. As illustrated, a bottom surface of each skid shoe 42 is in contact with the ground surface and the bottom surface defines a plane (represented by virtual plane 44, as shown in FIGS. 6-9B) substantially parallel with the ground surface. Although the illustrated the skid shoe 42 has a bottom surface defining a plane, in other embodiments, the bottom surface of the auger housing 34 may alternatively define the plane that is in contact with the ground surface.

The chute 30 is mounted to the frame 14 to direct snow and other material away from the frame 14. The illustrated chute 30 is rotatably mounted proximate the auger housing 34 of the frame 14. In other embodiments, the chute 30 may be located elsewhere on the frame 14. The chute 30 is rotatable relative to the frame 14 to discharge snow in different directions, as desired by an operator of the snow thrower 10.

Figure 3:
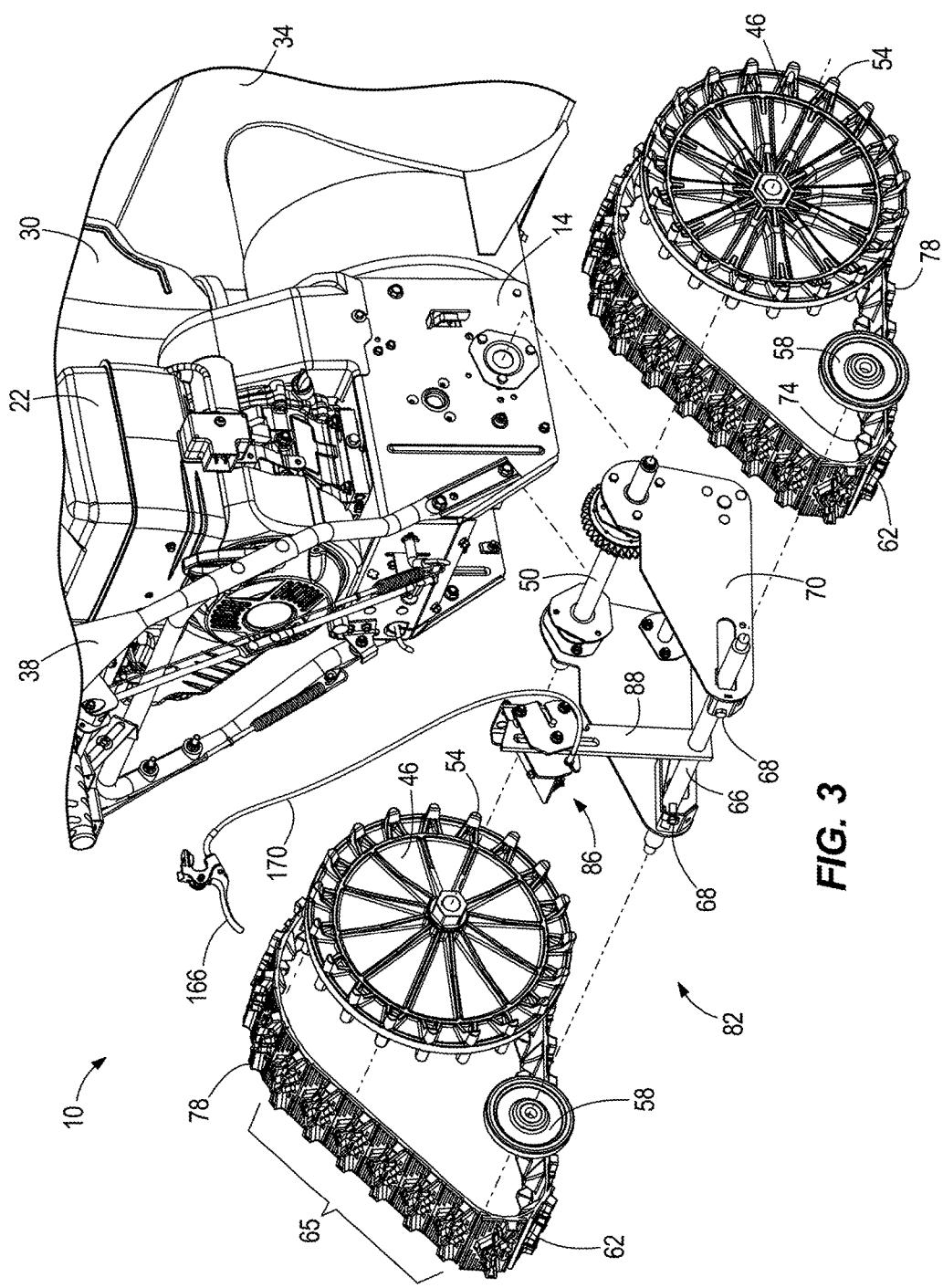
FIG. 3 is an exploded perspective view of a portion of the snow thrower of FIG. 1.

With reference to FIG. 3, each track drive assembly 18 includes a drive wheel 46 rotatably supported by the frame 14 and coupled to the prime mover 22 to drive the drive wheel 46. The drive wheel 46 rotates about a drive wheel axle 50 and includes a plurality of protrusions 54 regularly spaced about the circumference of the drive wheel 46. The protrusions 54 extend laterally away from opposing sides of the drive wheel 46.

Each track drive assembly 18 further includes an idler wheel 58 rotatably supported by the frame 14 and translatable relative to the frame 14. A flexible track 62 interconnects the drive wheel 46 and the idler wheel 58. The idler wheel 58 is spaced away from the drive wheel 46, such that two separate sections (i.e., a lowermost track section 64, as shown in FIG. 1, and an upper track section 65, as shown in FIG. 3) of the flexible track 62 span between the idler wheel 58 and the drive wheel 46. It should be readily apparent that the portions of the flexible track 62 forming the lowermost track section 64 and the upper track section 65 change as the track 62 is driven (e.g., rotated) by the drive wheel 46.

Further, the idler wheel 58 of each track drive assembly 18 is coupled together through an idler wheel axle 66. The idler wheel axle 66 allows each idler wheel 58 to rotate independently of each other about a common rotational axis. As shown in FIG. 3, a bracket 70 interconnecting the idler wheel axle 66 and the drive wheel axle 50 maintains a constant spacing between the idler wheel 58 and the drive wheel 46. The flexible track 62 is provided with an appropriate length to maintain a proper tension and minimize slack between the drive wheel 46 and the idler wheel 58. In the event the tension of the flexible track 62 is desired to be adjusted, an operator adjusts bolts 68 in order to change the relative position of idler wheel axle 66 relative to drive wheel axle 50. At least a portion of the lowermost track section 64 of each track 62 supports the snow thrower 10 on the ground surface. The flexible track 62 includes ridges 74 disposed along the inner periphery of the flexible track 62 at similarly spaced intervals to the protrusions 54 of the drive wheel 46. Accordingly, the protrusions 54 of the drive wheel 46 mesh with the ridges 74 of the flexible track 62 such that motion of the drive wheel 46 is directly transferred to the flexible track 62 and, in turn, to the idler wheel 58. The flexible track 62 further includes treads 78 disposed along the outer periphery of the flexible track 62 to facilitate traction between the snow thrower 10 and the ground surface.

Figure 4:
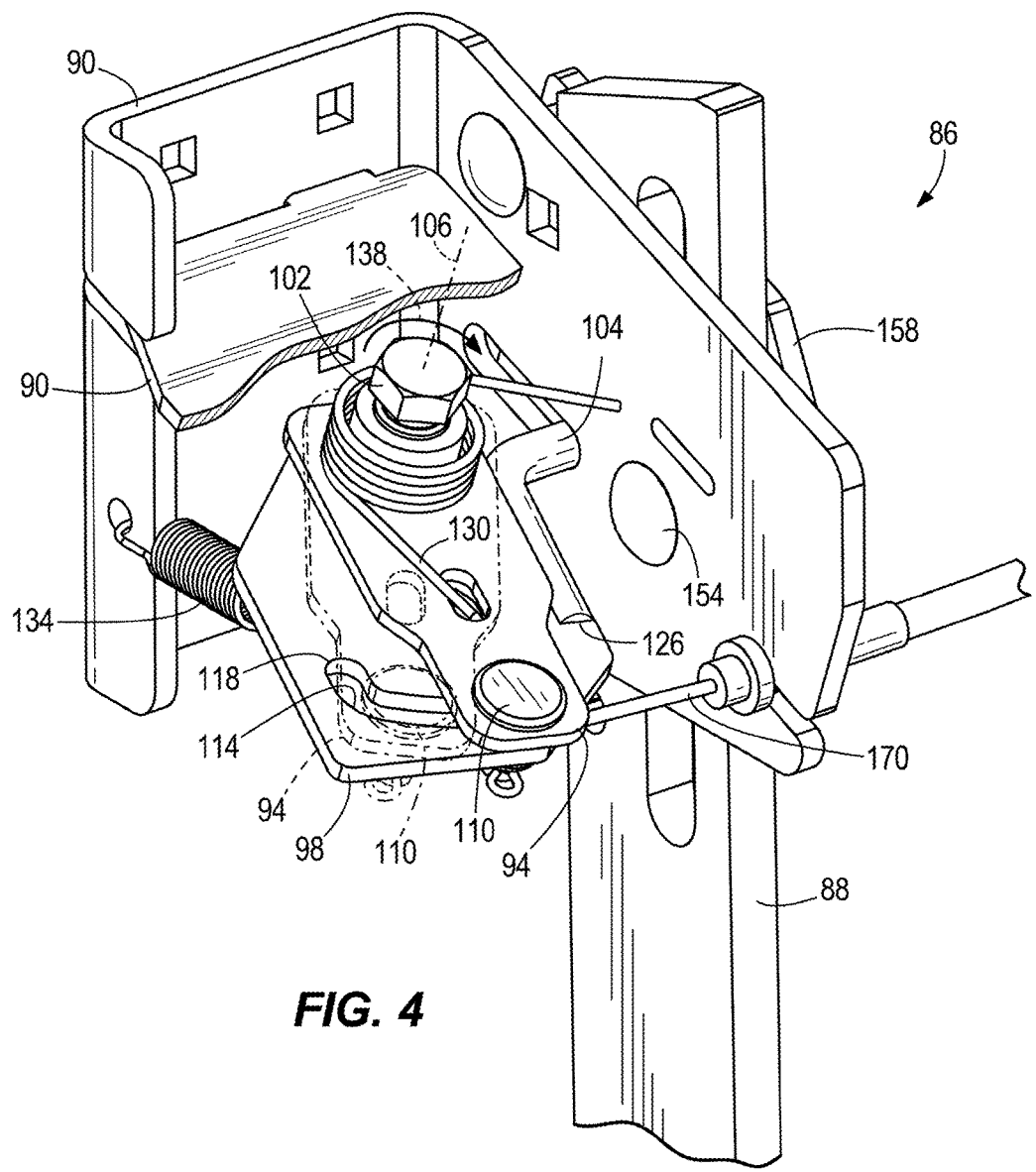
FIG. 4 is a perspective view of an idler wheel adjustment mechanism.

With reference to FIGS. 3 and 4, the snow thrower 10 also includes an idler wheel adjustment mechanism 82 for adjusting a position of each idler wheel 58 relative to the frame 14 in a vertical direction 84 (FIG. 1). As the position of each idler wheel 58 synchronously changes, an orientation (e.g., vertical position and/or angle) of the auger housing 34 is correspondingly adjusted relative to the ground surface. In other words, the idler wheel 58 is movable toward and away from the operator control assembly 38 in the vertical direction 84 to change the position angle of the auger housing 34 relative to the ground surface. The idler wheel adjustment mechanism 82 is interposed between the idler wheels 58 and the frame 14 to move the idlers wheels 58. In particular, at least a portion of the idler wheel adjustment mechanism 82 is coupled to frame 14, the operator control assembly 38, and the idler wheel axle 66.

Referring to FIG. 4, the idler wheel adjustment mechanism 82 includes a locking mechanism 86 that interfaces with an adjustment bar 88 for selectively maintaining the position of the idler wheels 58 relative to the frame 14. Specifically, the locking mechanism 86 is moveable between a locked state, in which the locking mechanism 86 is engaged with the adjustment bar 88 to inhibit translational movement of the idler wheel 58 relative to the frame 14, and an unlocked state, in which the locking mechanism 86 is disengaged from the adjustment bar 88 to permit translational movement of the idler wheel 58 relative to the frame 14. The locking mechanism 86 includes a mounting bracket 90 rigidly secured to the frame 14 to support the locking mechanism 86, and a top plate 94 and a bottom plate 98 rotationally coupled to the mounting bracket 90 via a bolt 102. The bolt 102 defines a rotational axis 106 about which the top plate 94 and the bottom plate 98 pivot. Rotation of the plates 94, 98 about the axis 106 causes a pin 104 to selectively engage the adjustment bar 88. The pin 104 is coupled to a shoulder 126 formed in the bottom plate 98.

Although the top plate 94 and the bottom plate 98 are independently rotationally secured to the bolt 102, the bottom plate 98 is dependent on the top plate 94 for movement. Each plate 94, 98 pivots separately between two pivot positions (i.e., a first pivot position and a second pivot position) that correspond to the locked state and the unlocked state of the locking mechanism 86, respectively.

The top plate 94 includes a stud 110 disposed at an opposite end from the rotational axis 106 of the top plate 94. The bottom plate 98 includes a groove 114 that extends through the bottom plate 98 for receiving the stud 110, thereby moveably coupling the top plate 94 and the bottom plate 98 together. The groove 114 has a first end 118 and a second end (not shown) opposite the first end 118 defining a maximum arc length in which the stud 110 traverses (or the top plate 94 pivots) relative to the bottom plate 98. As shown in FIG. 4, the top plate 94 in phantom lines illustrates the stud 110 proximate the first end 118, whereas the top plate 94 in solid lines illustrates the stud 110 proximate the second end. This independent movement of the top plate 94 relative to the bottom plate 98 inhibits inadvertent disengagement of the pin 104 from the adjustment bar 88.

With continued reference to FIG. 4, the locking mechanism 86 further includes a first biasing member 130 and a second biasing member 134. The first biasing member 130 is disposed coaxially with the rotational axis 106, and coupled between the top plate 94 and the mounting bracket 90. The second biasing member 134 is coupled between the bottom plate 98 and the mounting bracket 90. The first biasing member 130 and the second biasing member 134 urge the locking mechanism 86 toward the locked state. Specifically, the first and second biasing members 130, 134 urge the top plate 94 and the bottom plate 98, respectively, toward direction 138. In the illustrated embodiment of the snow thrower 10, the first biasing member 130 is a torsion spring, and the second biasing member 134 is a coil spring. Alternatively, the first biasing member 130 and the second biasing member 134 may be configured as other types of springs, which may be disposed at and coupled to other components of the snow thrower 10.

Figure 5:
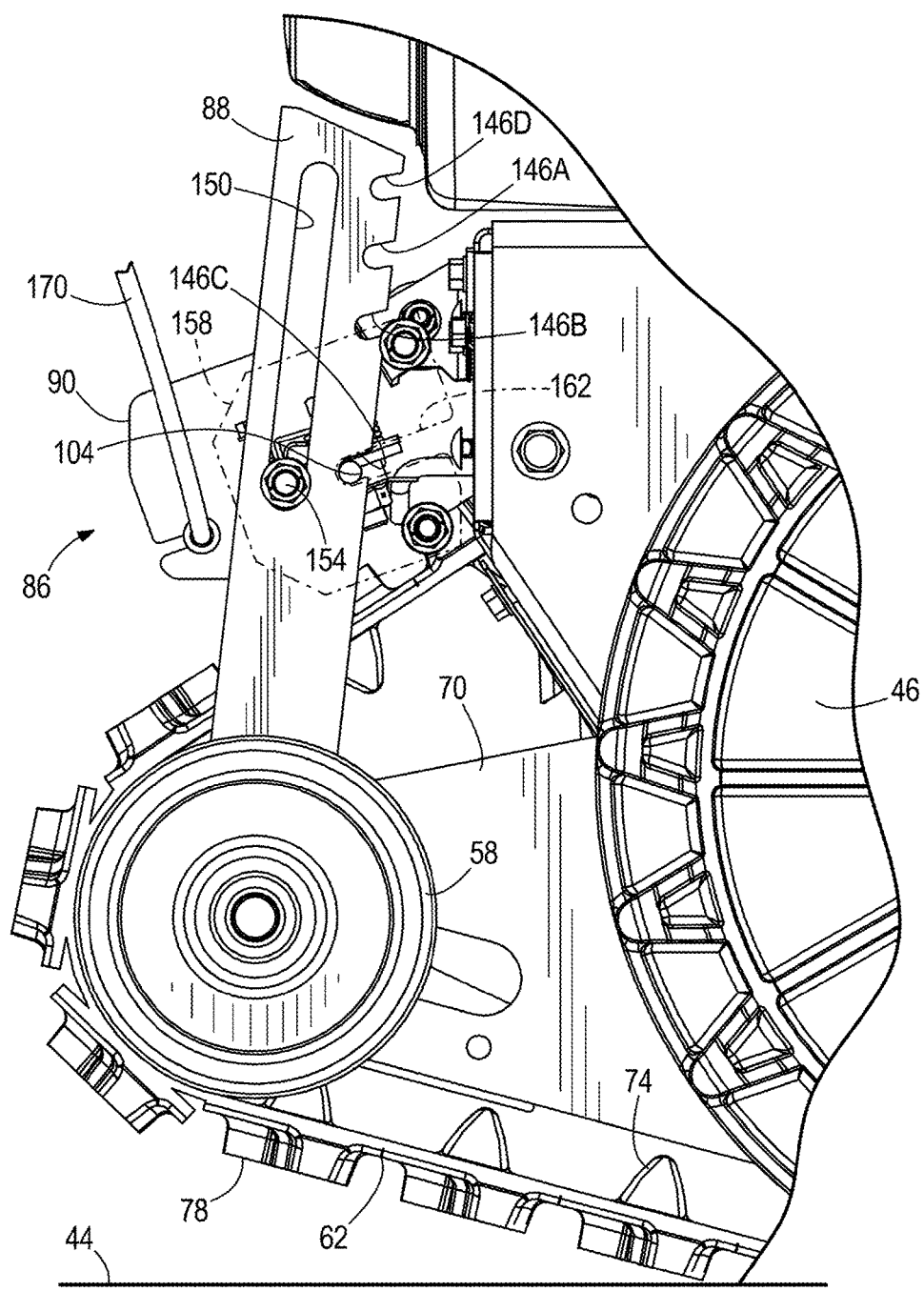
FIG. 5 is a partial cross-sectional view of the idler wheel adjustment mechanism taken along section line 5-5 of FIG. 2.

With reference to FIGS. 4 and 5, the adjustment bar 88 is interposed between the idler wheel axle 66 and the mounting bracket 90. The adjustment bar 88 is rigidly secured to the idler wheel axle 66 and selectively coupled to the pin 104 of the bottom plate 98. The adjustment bar 88 includes a plurality of notches (e.g., four notches 146A, 146B, 146C, and 146D) vertically spaced along the outer periphery of the adjustment bar 88. The notches 146A, 146B, 146C, 146D are capable of selectively receiving and retaining the pin 104 to configure the snow thrower 10 in a first or "default" operational mode (FIG. 6), a second or "shaving" operational mode (FIG. 7), a third or "maneuvering" operational mode (FIG. 8), and a fourth or "dig" operational mode (FIG. 9), respectively. The pin 104 is received by one of the notches 146A-D in the locked state, whereas the pin 104 is spaced away from the notches 146A-D in the unlocked state.

The adjustment bar 88 further includes an elongated slot 150 that movably couples the adjustment bar 88 to the mounting bracket 90. The elongated slot 150 receives a fastener 154 secured to the bracket 90, which facilitates guided movement of the adjustment bar 88 as the idler wheel 58 is correspondingly adjusted. Further, the elongated slot 150 limits vertical displacement of the adjustment bar 88, whereas horizontal movement of the adjustment bar 88 is constrained via a guide plate 158. The guide plate 158 is secured to the mounting bracket 90 via the fastener 154 and includes a channel 162 that receives the pin 104 of the bottom plate 98. The pin 104 traverses the channel 162 when moving between the locked state and the unlocked state.

The illustrated embodiment of the idler wheel adjustment mechanism 82 further includes an actuator 166 disposed proximate the operator control assembly 38. Specifically, the actuator 166 is disposed adjacent the grips 40 to provide easy access to an operator. In some embodiments, the actuator 166 may alternatively be disposed on the frame 14. The actuator 166 is coupled to the stud 110 of the top plate 94 via a linkage member 170. The actuator 166 is user-manipulatable (e.g., squeezable) to selectively disengage the pin 104 from one of the notches 146A-D of the adjustment bar 88. For example, squeezing the actuator 166 causes the linkage member 170 to pivot the plates 94, 98 to the unlocked position and the pin 104 simultaneously disengages from the notches 146A-D. In the illustrated embodiment, the linkage member 170 includes a cable and, more particularly, a Bowden cable. In other embodiments, the linkage member 170 may alternatively include a chain, a rod, a link, or the like. Furthermore, although the illustrated actuator 166 is a pivoting lever, in other embodiment, the actuator 166 may alternatively be a trigger, a switch, a dial, a button, or the like.

In operation, the idler wheel 58 is adjustable relative to the frame 14 to configure the snow thrower 10 in different operational modes by positioning the locking mechanism 86 in the unlocked state and simultaneously either pushing down on the grips 40 to move the idler wheel 58 upwardly or lifting up on the grips 40 to move the idler wheel 58 downwardly (under the force of gravity). As such, the snow thrower 10 can be configured in the first or "default" operational mode (FIG. 6), the second or "shaving" operational mode (FIG. 7), the third or "maneuvering" operational mode (FIG. 8), and the fourth or "dig" operational mode (FIG. 9). In order to secure the snow thrower 10 in one of the operational modes, the pin 104 of the bottom plate 98 is received in one of the notches 146A-D of the adjustment bar 88, as described in further detail below.

Prior to configuring the snow thrower 10 in one of the various operational modes, the locking mechanism 86 is in the locked state, in which the top plate 94 and the bottom plate 98 are in the first pivot position, such that the pin 104 is correspondingly received in one of the notches 146A-D of the adjustment bar 88. In order to reconfigure the snow thrower 10 to a different operational mode, an operator actuates the actuator 166 and adjusts the position of the idler wheel 58. Specifically, actuating the actuator 166 forces the stud 110 of the top plate 94 against the bias of the first biasing member 130 via the cable 170 which, in turn, pivots the top plate 94 and the bottom plate 98 from the first pivot position toward the second pivot position. As such, the stud 110 is displaced from the first end 118 of the groove 114 toward the opposite end of the groove 114. Subsequently, the stud 110 abuts the opposite end of the groove 114, thereby forcing the bottom plate 98 against the bias of the second biasing member 134. Similarly, the bottom plate 98 pivots from the first pivot position toward the second pivot position. Once the top plate 94 and the bottom plate 98 are pivoted to the second pivot position, the locking mechanism 86 is in the unlocked state. As a result, the pin 104 is disengaged from the respective notch 146A-D of the adjustment bar 88. However, the pin 104 is still received in the channel 162 of the guide plate 158 to ensure proper alignment and movement of the pin 104 with respect to the plurality of notches 146A-D. When a desired position of the idler wheel 58 is determined by pushing down or lifting up on the grips 40, an operator releases the actuator 166 causing the locking mechanism 86 to pivot toward the locked state.

Figure 6:
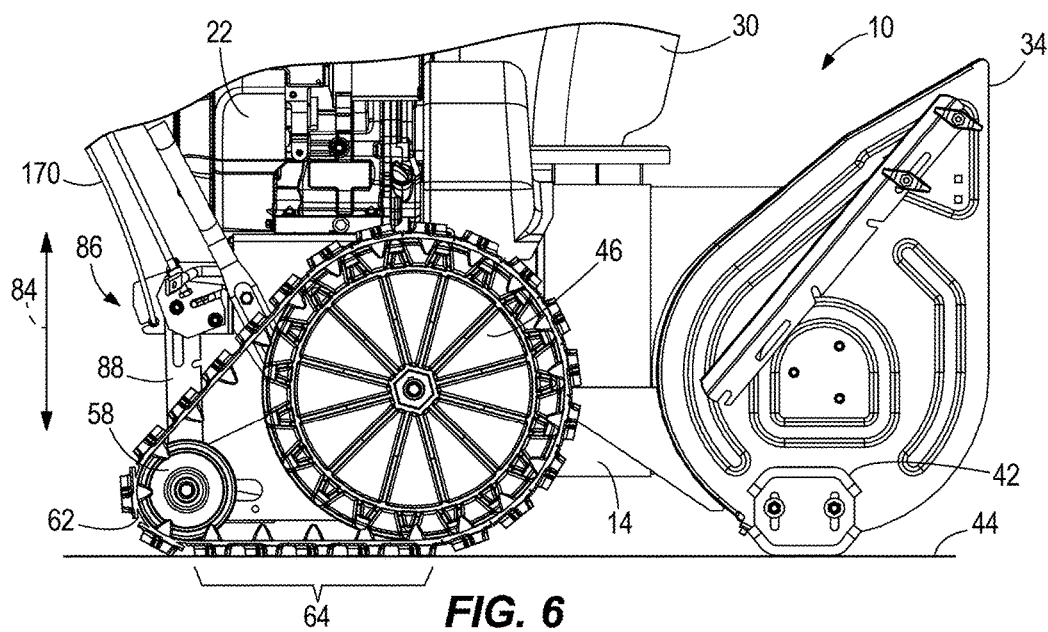
FIG. 6 is a side view of the snow thrower of FIG. 1 in a first operational mode.

With reference to FIG. 6, the idler wheel 58 is secured in a first position, and the pin 104 is engaged with the notch 146A of the adjustment bar 88. When the idler wheels 58 are in the first position, the snow thrower 10 is configured in the default operational mode. In the default operational mode, the lowermost track sections 64 are coplanar with the virtual plane 44 extending from the bottom surfaces of the skid shoes 42. As a result, the frame 14 of the snow thrower 10 is oriented horizontally or parallel relative to the ground surface.

Figure 7:
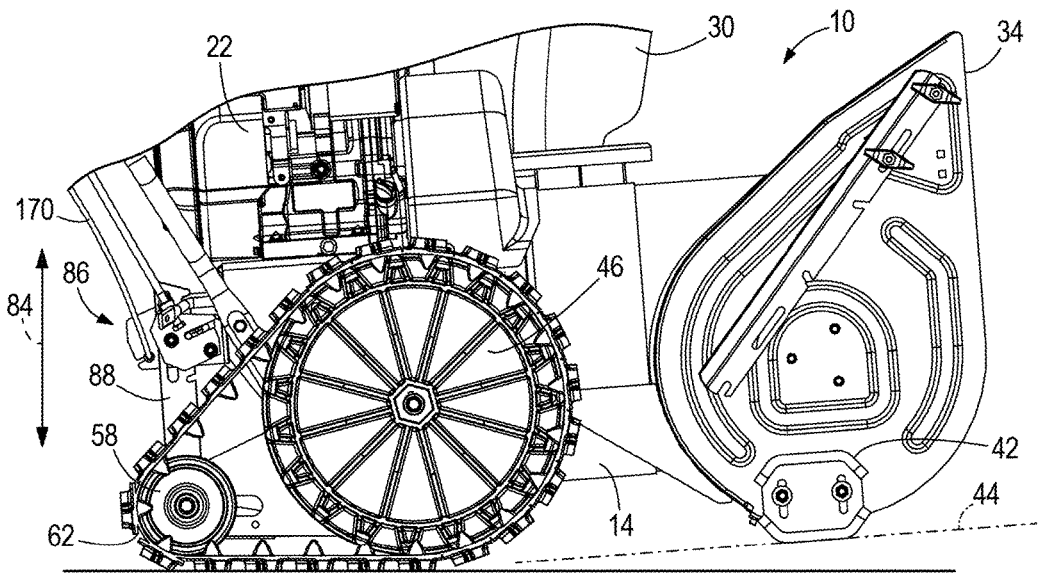
FIG. 7 is a side view of the snow thrower of FIG. 1 in a second operational mode.
Figure 8:
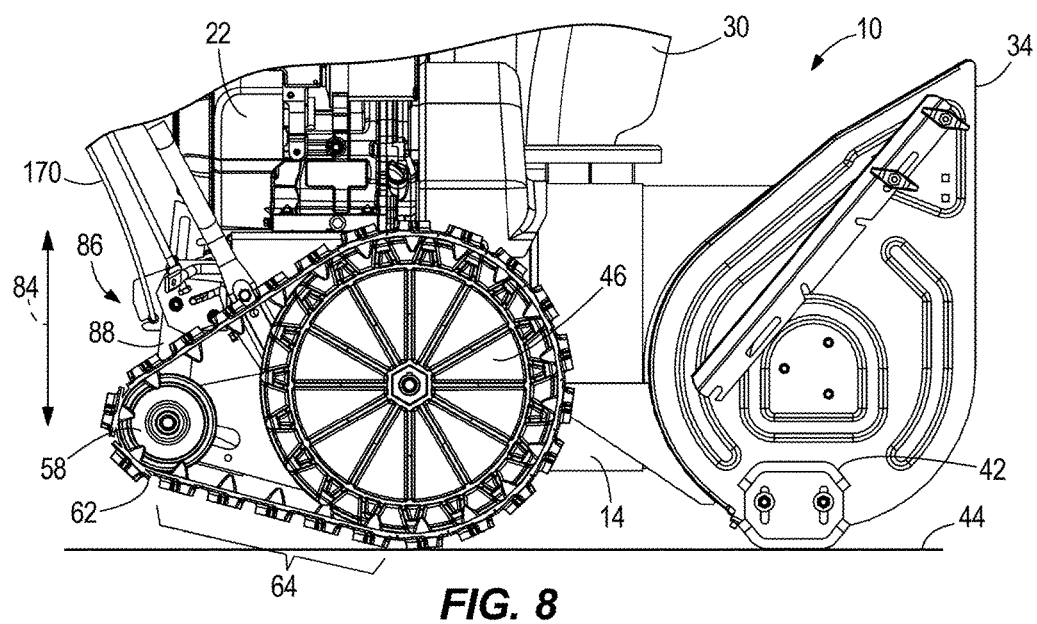
FIG. 8 is a side view of the snow thrower of FIG. 1 in a third operational mode.

With reference to FIGS. 7 and 8, the idler wheels 58 are secured in a second position and a third position, respectively. By pushing down on the grips 40 when the locking mechanism 86 is in the unlocked state, the idler wheels 58 are moved upwardly in the vertical direction 84 (FIG. 1) to be moved toward the operator control assembly 38. The idler wheels 58 are closest in distance to the control assembly 38 in the third position. The pin 104 is received in the notch 146B when the idler wheels 58 are in the second position, whereas the pin 104 is received in the notch 146C when the idler wheels 58 are in the third position. As such, the snow thrower 10 may be configured in one of the shaving mode and the maneuvering mode. In the shaving mode and the maneuvering mode, at least a portion of the perimeters of the idler wheels 58 are spaced above or away from the virtual plane 44 of the skid shoes 42. As a result, the frame 14 of the snow thrower 10 may be tilted rearward (e.g., in the shaving mode) such that the auger housing 34, and ultimately the auger 26, is spaced away from the ground surface. Alternatively, in the maneuvering mode, the idler wheels 58 are moved further away from the ground surface so that only a small portion of each flexible track 62 engages the ground surface, thereby allowing the snow thrower 10 to be more easily turned or maneuvered about the drive wheels 46.

Figure 9A:
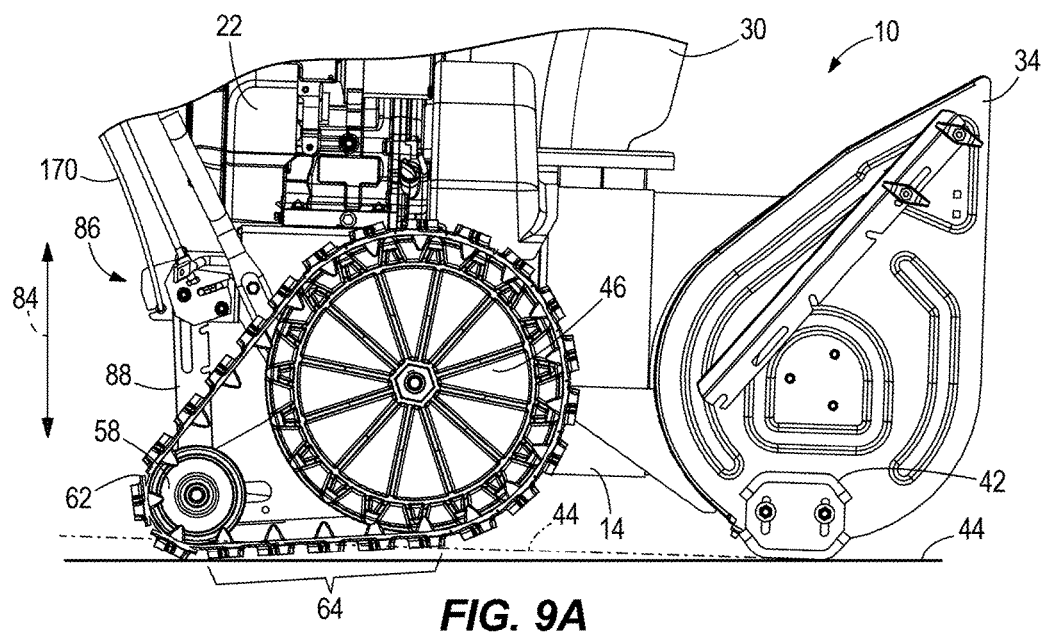
FIG. 9A is a side view of the snow thrower of FIG. 1 in a fourth operational mode.
Figure 9B:
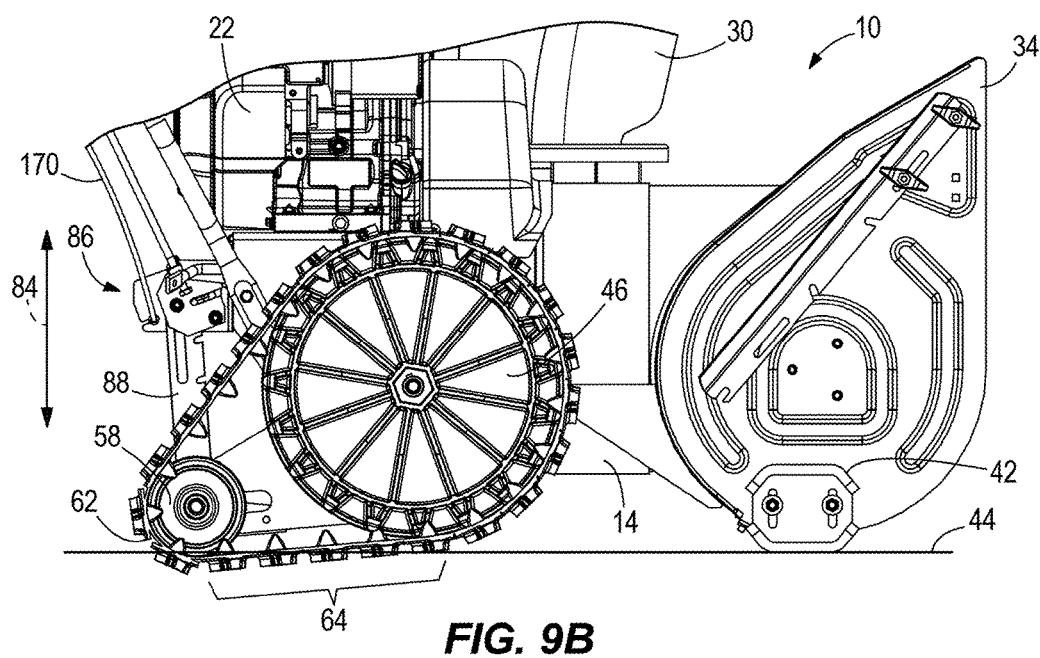
FIG. 9B is a side view of the snow thrower of FIG. 1 in the fourth operation mode.

With reference to FIGS. 9A and 9B, the idler wheels 58 are secured in a fourth position. In the fourth position, the idler wheels 58 are moved downwardly in the vertical direction 84 (FIG. 1) (either manually or due to gravity) to be spaced a distance further away from the operator control assembly 38 compared to the first position. At this point, at least a portion of the perimeters of the idler wheels 58 are spaced below or "moved toward" the virtual plane 44 defined by the skid shoes 42, as shown in FIG. 9B. The pin 104 is received in the notch 146D when the idler wheels 58 are in the fourth position. As such, the snow thrower 10 is configured in the dig mode. In the dig mode, the drive wheels 46 are spaced away from the ground surface causing the frame 14 of the snow thrower 10 to tilt forward, as shown in FIG. 9A. At this point, a greater amount of weight of the snow thrower 10 is supported by the auger housing 34, thereby allowing the auger 26 to dislodge heavily compacted snow from the ground surface with greater efficiency.

Figure 10:
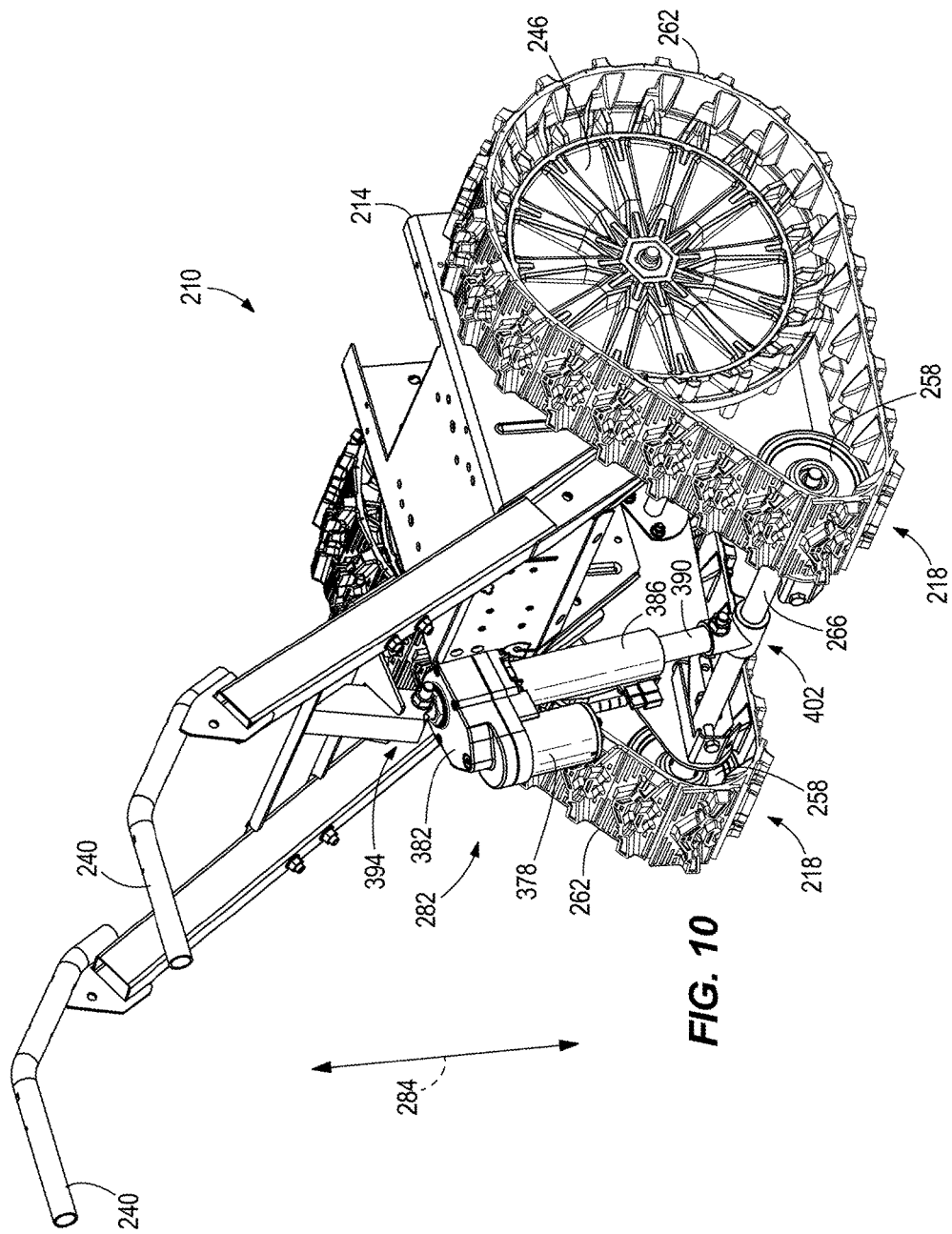
FIG. 10 is a rear perspective view of a portion of a snow thrower having a track drive system according to another embodiment of the invention.

FIG. 10 illustrates a portion of a snow thrower 210 in accordance with another embodiment of the invention. The snow thrower 210 includes an idler wheel adjustment mechanism 282, but is otherwise similar to the snow thrower 10 described above with reference to FIGS. 1-9B, with like components being shown with like reference numerals plus 200. The prime mover, auger housing, and other components of the snow thrower 210 are not illustrated in FIGS. 10-12 to simplify the drawings. Only the differences between the snow throwers 10, 210 are described below.

Figure 11:
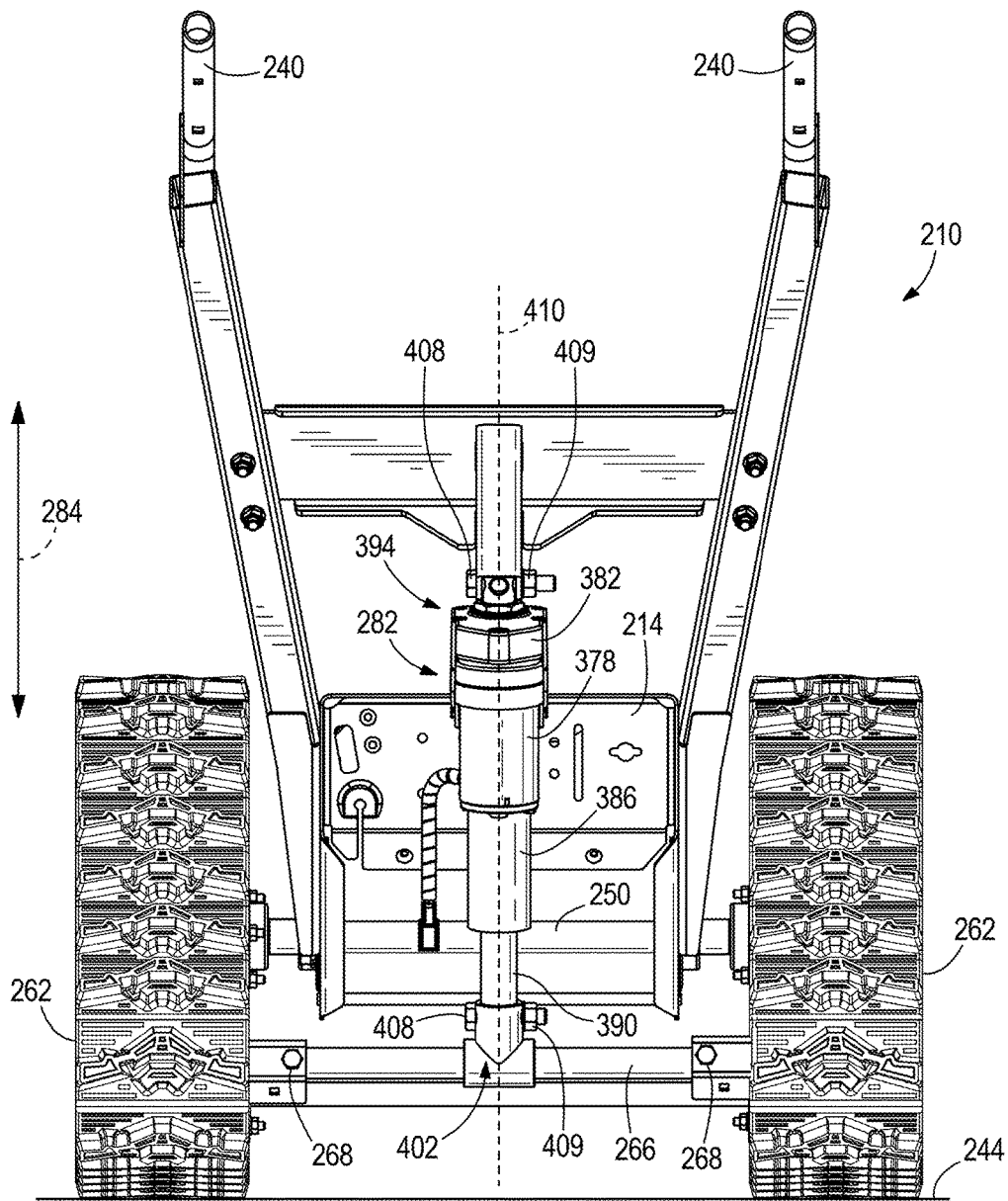
FIG. 11 is a rear plan view of the snow thrower of FIG. 10.

The illustrated snow thrower 210 includes a frame 214, track drive assemblies 218, a prime mover (not shown, but identical to prime mover 22), an auger (not shown, but identical to auger 26), and a chute (not shown, but identical to chute 30). Grips 240 extend from the frame 214 in a direction opposite an auger housing (not shown, but identical to auger housing 34). The grips 240 are configured to be grasped by an operator to move and maneuver the snow thrower 210 along a ground surface (represented by virtual plane 244, as shown in FIG. 11). The track drive assemblies 218 are rotatably coupled to the frame 214 to facilitate moving the snow thrower 210 along the ground surface. As shown in FIG. 11, at least a portion of each track 262 supports the snow thrower 210 on the ground surface.

Figure 12:
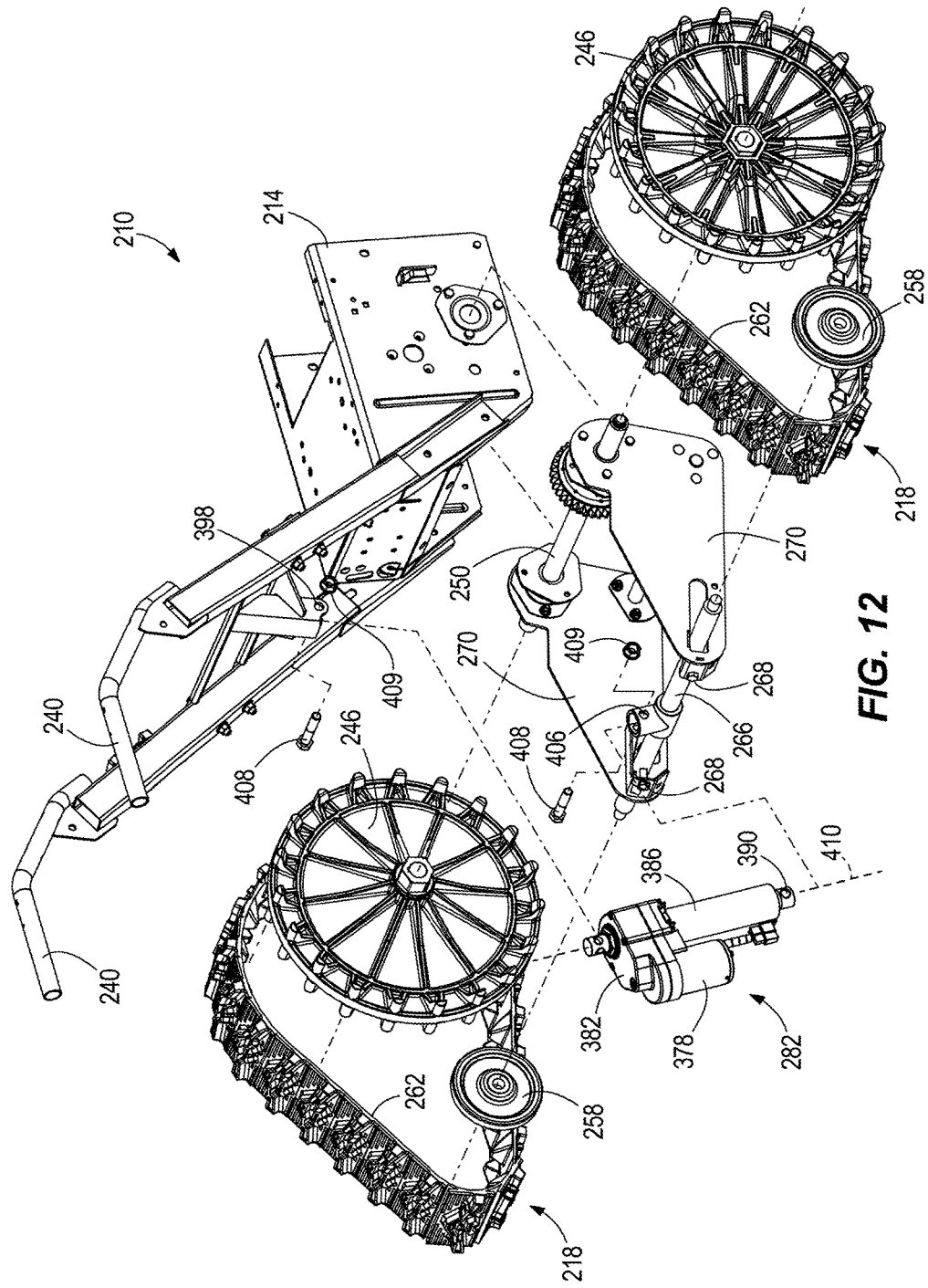
FIG. 12 is an exploded perspective view of the snow thrower of FIG. 10.

With reference to FIG. 10-12, each track drive assembly 218 includes a drive wheel 246 rotatably supported by the frame 214 and coupled to the prime mover to drive the drive wheel 246. The drive wheel 246 rotates about a drive wheel axle 250.

Each track drive assembly 218 further includes an idler wheel 258 rotatably supported by the frame 214 and translatable relative to the frame 214. A flexible track 262 interconnects the drive wheel 246 and the idler wheel 258. Further, the idler wheel 258 of each track drive assembly 218 is coupled together through an idler wheel axle 266. The idler wheel axle 266 allows each idler wheel 258 to rotate independently of each other about a common rotational axis. As shown in FIG. 12, a bracket 270 interconnecting the idler wheel axle 266 and the drive wheel axle 250 maintains a constant spacing between the idler wheel 258 and the drive wheel 246. The flexible track 262 is provided with an appropriate length to maintain a proper tension and minimize slack between the drive wheel 246 and the idler wheel 258. In the event the tension of the flexible track 262 is desired to be adjusted, an operator adjusts bolts 268 in order to change the relative position of idler wheel axle 266 relative to drive wheel axle 250. The flexible track 262 meshes with the drive wheel 246 and the idler wheel 258 such that motion of the drive wheel 246 is directly transferred to the flexible track 262 and, in turn, to the idler wheel 258.

With reference to FIGS. 10-12, the idler wheel adjustment mechanism 282 is capable of adjusting a position of each idler wheel 258 relative to the frame 214 in a vertical direction 284 (FIG. 10). As the position of each idler wheel 258 synchronously changes, an orientation (e.g., vertical position and/or angle) of the auger housing is correspondingly adjusted relative to the ground surface. In other words, the idler wheel 258 is movable toward and away from an operator control assembly (or the grips 240) in the vertical direction 284 to change the position angle of the auger housing relative to the ground surface. The idler wheel adjustment mechanism 282 is interposed between the idler wheels 258 and the frame 214 to move the idlers wheels 258. In particular, at least a portion of the idler wheel adjustment mechanism 282 is coupled to frame 214, the operator control assembly, and the idler wheel axle 266.

Referring to FIG. 12, the idler wheel adjustment mechanism 282 is a linear actuator having a drive mechanism 378, a drive mechanism housing 382, a cylinder 386 extending from the housing 382, and a plunger 390 slidably mounted within the cylinder 386. At a first end 394, the housing 382 interfaces with a portion of the frame 214 via a first pin joint 398, and at a second end 402, the plunger 390 interfaces with the idler wheel axle 266 at a second pin joint 406. Threaded bolts 408 (with corresponding nuts 409) are received at the first and second pin joints 398, 406 to selectively couple the linear actuator 282 to the snow thrower 210.

The linear actuator 282 of the illustrated embodiment may be a conventional electric-linear-type actuator such that the drive mechanism 378 (e.g., a brushless electric motor) rotatably drives a lead screw disposed within the cylinder 386. Depending on the orientation and position of the drive mechanism 378 relative to the lead screw, a gear train is implemented to transfer rotational movement between the drive mechanism 378 and the lead screw. The lead screw is rotatably mounted within the cylinder 386 and threaded to at least a portion of the plunger 390. As a result, the plunger 390 displaces along a longitudinal axis 410 in response to rotational movement of the lead screw (i.e., through activation of the drive mechanism 378). In some embodiments, the linear actuator 282 may be various types of mechanical actuators, hydraulic actuators, pneumatic actuators, piezoelectric actuators, or other types of electro-mechanical actuators.

The illustrated embodiment, the idler wheel adjustment mechanism 282 further includes a manual actuator (not shown, but similar to the actuator 166) disposed proximate the operator control assembly or the grips 240. The manual actuator is electrically connected to the drive mechanism 378 and is user-manipulatable to activate the drive mechanism 378. Specifically, movement of the manual actuator in a first direction actuates the plunger 390 toward a retracted position (FIG. 12), whereas movement of the manual actuator in a second direction actuates the plunger 390 toward an extended position. In some embodiments, the linear actuator 282 may include limit switches that electrically communicate with the drive mechanism 378 and interface with the plunger 390 in order to stop movement of the plunger 390 and therefore the idler wheel 258 in a variety of predetermined positions corresponding to the first position, the second position, the third position, and the fourth position of the idler wheel 258.

The illustrated plunger 390 is infinitely adjustable by the drive mechanism 378 so that the position of the idler wheels 258 is infinitely adjustable relative to the frame 214. That is, a position of the plunger 390 relative to the frame 214 is infinitely adjustable by the drive mechanism 378 between the retracted position and the extended position. Since the position of the plunger 390 is infinitely adjustable, the position of the idler wheel axle 266 and the idler wheels 258, which are coupled to and move with the plunger 390, is infinitely adjustable. By "infinitely adjustable" the plunger 390 (and thereby the idler wheels 258) can be stopped and held in any position between the retracted position and the extended position, in contrast to the limited number of discrete positions provided by the pin 104 and the notches 146A-D discussed with reference to FIGS. 1-9.

In operation, the idler wheel 258 is adjustable relative to the frame 214 to configure the snow thrower 210 in different operational modes by actuating the plunger 390 to move the idler wheel 258 upwardly or downwardly in direction 284. As such, the snow thrower 210 can be configured in the first or "default" operational mode (similar to FIG. 6), the second or "shaving" operational mode (similar to FIG. 7), the third or "maneuvering" operational mode (similar to FIG. 8), and the fourth or "dig" operational mode (similar to FIG. 9). In order to secure the snow thrower 210 in one of the operational modes, the manual actuator is manipulated by an operator to drive the drive mechanism 378 and the plunger 390. Once the idler wheel 258 is positioned at a desirable location, the operator ceases manipulation of the manual actuator, thereby maintaining the idler wheel 258 in the desired position. Alternatively, an operator may manipulate the manual actuator until the plunger 390 interfaces with the limit switch, thereby deactivating the drive mechanism 378 and maintaining the plunger 390 in one or more predetermined positions.

Although the idler wheel adjustment mechanism 82, 282 is discussed above with reference to a snow thrower 10, 210, it should be readily apparent that the idler wheel adjustment mechanism 82, 282 is also usable with other types of utility machines.

Various features and advantages of the invention are set forth in the following claims.

What is claimed is:

1. A snow thrower comprising:
   a frame;
   a prime mover supported by the frame;
   a handle assembly coupled to the frame, the handle assembly including a grip for an operator to grasp;
   an auger housing supported by the frame;
   an auger blade rotationally coupled to and disposed within the auger housing; and
   a track drive system coupled to the frame to facilitate movement along a ground surface, the track drive system including
      a drive wheel rotatably driven by the prime mover,
      an idler wheel rotatably supported by the frame, and
      a flexible track interconnecting the drive wheel and the idler wheel,
   wherein the idler wheel is translatable relative to the frame and to the drive wheel to adjust an orientation of the auger housing relative to the ground surface, and
   wherein a portion of the flexible track between the idler wheel and the ground surface is removed from contact with the ground surface when the idler wheel translates upwardly relative to the frame.

2. The snow thrower of claim 1, wherein in a first mode of operation, a virtual plane is defined by a bottom edge of the auger housing and a lowermost section of the flexible track extending between the drive wheel and the idler wheel, and wherein in a second mode of operation, the idler wheel is moved away from the virtual plane.

3. The snow thrower of claim 2, wherein the idler wheel is releasably securable in a first position corresponding to the first mode of operation and in a second position corresponding to the second mode of operation.

4. The snow thrower of claim 2, wherein in another mode of operation, the idler wheel is moved further away from the virtual plane.

5. The snow thrower of claim 4, wherein the idler wheel is releasably securable in a first position corresponding to the first mode of operation, in a second position corresponding to the second mode of operation, and in a third position corresponding to the another mode of operation.

6. The snow thrower of claim 2, wherein in another mode of operation, the idler wheel is moved toward the virtual plane.

7. The snow thrower of claim 5, wherein the idler wheel is releasably securable in a first position corresponding to the first mode of operation, in a second position corresponding to the second mode of operation, and in a third position corresponding to the another mode of operation.

8. The snow thrower of claim 1, wherein the idler wheel is movable toward and away from the grip of the handle assembly.

9. The snow thrower of claim 1, further comprising an actuator supported by the handle assembly or the frame, wherein the actuator is operable to allow movement of the idler wheel toward and away from the grip.

10. The snow thrower of claim 1, further comprising an idler wheel adjustment mechanism interposed between the idler wheel and the frame, wherein the idler wheel adjustment mechanism includes
    an adjustment bar coupled to and extending from the idler wheel, the adjustment bar having a plurality of notches, a pin selectively receivable in each of the plurality of notches,
an actuator supported by the handle assembly, and
a linkage member having a first end coupled to the pin and a second end coupled to the actuator,
wherein the actuator is operable to actuate the linkage member and move the pin out of each of the plurality of notches.

11. The snow thrower of claim 10, wherein when the pin is received in one of the plurality of notches, the idler wheel is inhibited from translating relative to the frame, and wherein when the pin is moved out of the plurality of notches, the idler wheel is translatable relative to the frame.

12. The snow thrower of claim 10, wherein the idler wheel adjustment mechanism further includes a biasing member for urging the pin into each of the plurality of notches.

13. The snow thrower of claim 1, wherein the flexible track includes a lowermost section, and wherein the idler wheel is translatable relative to the frame to move the lowermost section relative to the auger housing.

14. The snow thrower of claim 1, further comprising an idler wheel adjustment mechanism interposed between the idler wheel and the frame, wherein the idler wheel adjustment mechanism includes
a drive mechanism supported by the frame,
a plunger slideably mounted to the frame, the plunger coupled to the idler wheel to translate the idler wheel relative to the frame, and
an actuator supported by the frame or the handle assembly and connected to the drive mechanism, the actuator operable to activate the drive mechanism, thereby moving the plunger and the idler wheel relative to the frame.

15. The snow thrower of claim 14, wherein a position of the plunger relative to the frame is infinitely adjustable by the drive mechanism between a retracted position and an extended position.

16. The snow thrower of claim 1, wherein the idler wheel translates along an arcuate path about the drive wheel.

17. The snow thrower of claim 6, wherein in the another mode of operation, a portion of the flexible track between the drive wheel and the ground surface is removed from contact with the ground surface while the idler wheel and the auger housing remain in contact with the ground surface in response to the idler wheel being spaced below the virtual plane.

18. A snow thrower comprising:
a frame;
a prime mover supported by the frame;
a handle assembly coupled to the frame, the handle assembly including a grip for an operator to grasp;
an auger housing supported by the frame;
an auger blade rotationally coupled to and disposed within the auger housing;
a track drive system coupled to the frame to facilitate movement along a ground surface, the track drive system including
a drive wheel rotatably driven by the prime mover,
an idler wheel rotatably supported by the frame, and
a flexible track interconnecting the drive wheel and the idler wheel; and
an idler wheel adjustment mechanism for adjusting a position of the idler wheel relative to the frame and to the drive wheel, the idler wheel adjustment mechanism including,
an adjustment bar coupled to and extending from the idler wheel, the adjustment bar having a first notch and a second notch spaced apart from the first notch, and
a pin selectively received in the first notch to releasably secure the idler wheel in a first position relative to the frame and selectively received in the second notch to releasably secure the idler wheel in a second position that is different than the first position relative to the frame,
wherein a portion of the flexible track between the idler wheel and the ground surface is removed from contact with the ground surface when the idler wheel translates upwardly relative to the frame.

19. The snow thrower of claim 18, wherein when the pin is received in the first notch, the idler wheel is spaced a first vertical distance from the grip, and wherein when the pin is received in the second notch, the idler wheel is spaced a second vertical distance from the grip.

20. The snow thrower of claim 19, wherein the adjustment bar includes a third notch spaced apart from the first notch and the second notch, and wherein the pin is selectively received in the third notch to releasably secure the idler wheel in a third position relative to the frame.

21. The snow thrower of claim 20, wherein when the pin is received in the third notch, the idler wheel is spaced a third vertical distance from the grip.

22. The snow thrower of claim 18, wherein the idler wheel adjustment mechanism further includes an actuator supported by the frame or the handle assembly, and a linkage member having a first end coupled to the pin and a second end coupled to the actuator, wherein the actuator is operable to actuate the linkage member to move the pin out of the first notch and the second notch.

23. The snow thrower of claim 22, wherein the linkage member includes a cable.

24. The snow thrower of claim 18, wherein the idler wheel translates along an arcuate path about the drive wheel.

25. The snow thrower of claim 18, further comprising a virtual plane being defined by a bottom edge of the auger housing and a lowermost section of the flexible track extending between the drive wheel and the idler wheel, wherein a portion of the flexible track between the drive wheel and the ground surface is removed from contact with the ground surface while the idler wheel and the auger housing remain in contact with the ground surface in response to the idler wheel being spaced below the virtual plane.

26. A snow thrower comprising:
a frame;
a prime mover supported by the frame;
a handle assembly coupled to the frame, the handle assembly including a grip for an operator to grasp;
an auger housing supported by the frame;
an auger blade rotationally coupled to and disposed within the auger housing; and
a track drive system coupled to the frame to facilitate movement along a ground surface, the track drive system including
a drive wheel rotatably driven by the prime mover,
an idler wheel rotatably supported by the frame, and
a flexible track interconnecting the drive wheel and the idler wheel,
wherein the idler wheel is translatable relative to the frame and to the drive wheel to adjust an orientation of the auger housing relative to the ground surface, and
wherein the idler wheel translates along an arcuate path about the drive wheel.

27. A snow thrower comprising:
a frame;
a prime mover supported by the frame;
a handle assembly coupled to the frame, the handle assembly including a grip for an operator to grasp;
an auger housing supported by the frame;
an auger blade rotationally coupled to and disposed within the auger housing;
a track drive system coupled to the frame to facilitate movement along a ground surface, the track drive system including
 a drive wheel rotatably driven by the prime mover,
 an idler wheel rotatably supported by the frame, and
 a flexible track interconnecting the drive wheel and the idler wheel; and
an idler wheel adjustment mechanism for adjusting a position of the idler wheel relative to the frame and to the drive wheel, the idler wheel adjustment mechanism including,
 an adjustment bar coupled to and extending from the idler wheel, the adjustment bar having a first notch and a second notch spaced apart from the first notch, and
 a pin selectively received in the first notch to releasably secure the idler wheel in a first position relative to the frame and selectively received in the second notch to releasably secure the idler wheel in a second position that is different than the first position relative to the frame,
wherein the idler wheel translates along an arcuate path about the drive wheel.

\* \* \* \* \*